United States Patent
Wei et al.

(10) Patent No.: US 10,973,005 B2
(45) Date of Patent: Apr. 6, 2021

(54) METHODS AND RELATED DEVICES FOR RESOURCE ALLOCATION

(71) Applicants: HON HAI PRECISION INDUSTRY CO., LTD., New Taipei (TW); NATIONAL TAIWAN UNIVERSITY, Taipei (TW)

(72) Inventors: Hung-Yu Wei, Taipei (TW); Ching-Chun Chou, Taipei (TW)

(73) Assignees: HON HAI PRECISION INDUSTRY CO., LTD., New Taipei (TW); NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 16/116,931

(22) Filed: Aug. 30, 2018

(65) Prior Publication Data

US 2019/0069274 A1 Feb. 28, 2019

Related U.S. Application Data

(60) Provisional application No. 62/551,802, filed on Aug. 30, 2017.

(51) Int. Cl.
| | |
|---|---|
| *H04L 5/00* | (2006.01) |
| *H04W 72/04* | (2009.01) |
| *H04W 88/08* | (2009.01) |
| *H04B 17/382* | (2015.01) |

(52) U.S. Cl.
CPC ........... *H04W 72/04* (2013.01); *H04L 5/0035* (2013.01); *H04B 17/382* (2015.01); *H04W 88/08* (2013.01)

(58) Field of Classification Search
CPC ... H04L 5/0035; H04L 12/5695; H04L 47/78; H04W 72/04; H04W 72/00; H04W 72/1278; H04B 17/382; Y02D 10/22; Y02D 10/36
See application file for complete search history.

(56) References Cited

U.S. PATENT DOCUMENTS

| | | | | |
|---|---|---|---|---|
| 2011/0117947 A1* | 5/2011 | Ishii | ........................ | H04L 5/003 455/509 |
| 2015/0270868 A1* | 9/2015 | Park | ..................... | H04B 1/7143 370/329 |
| 2016/0174289 A1* | 6/2016 | Pu | ..................... | H04W 72/1278 455/574 |
| 2019/0245664 A1* | 8/2019 | Kim | ........................ | H04L 5/00 |

FOREIGN PATENT DOCUMENTS

| | | |
|---|---|---|
| CN | 102017755 A | 4/2011 |
| CN | 104507169 A | 4/2015 |

* cited by examiner

*Primary Examiner* — Salvador E Rivas
(74) *Attorney, Agent, or Firm* — ScienBiziP, P.C.

(57) ABSTRACT

A method for resource allocation includes acquiring resource information indicating an available wireless resource and an available computing resource, and allocating the available wireless resource and the available computing resource for a transmission mode of a wireless transmission based on the resource information and a system utility requirement.

6 Claims, 11 Drawing Sheets

METHODS AND RELATED DEVICES FOR RESOURCE ALLOCATION

CROSS-REFERENCE TO RELATED APPLICATION(S)

The present application claims the benefit of and priority to a provisional U.S. Patent Application Ser. No. 62/551,802 filed on Aug. 30, 2017, entitled "ALLOCATION SYSTEM AND ALLOCATION METHOD FOR WIRELESS RESOURCE AND PROCESSING RESOURCE," (hereinafter referred to as "US70923 application"). The disclosure of the US70923 application is hereby incorporated fully by reference into the present application.

FIELD

The present disclosure generally relates to wireless communication, and more particularly, to methods and related devices for resource allocation in a wireless communication system.

BACKGROUND

In general, a wireless system performs, two main functions: wireless transmission and traffic processing. The wireless transmission function includes, for example, transmitting and receiving data traffic through a medium such as an air interface, and the traffic processing function includes, for example, encoding, decoding and executing corresponding operations of the data traffics. However, these two functions usually operate independently, resulting in poor system utilization. For example, the wireless system may grant a request for wireless transmission even when the computational task in process is overloaded.

Therefore, a joint resource allocation of wireless and computing resources is needed for improving performance of the wireless system.

SUMMARY

The present disclosure is directed to methods and related devices for resource allocation.

DETAILED DESCRIPTION

Figure 1:
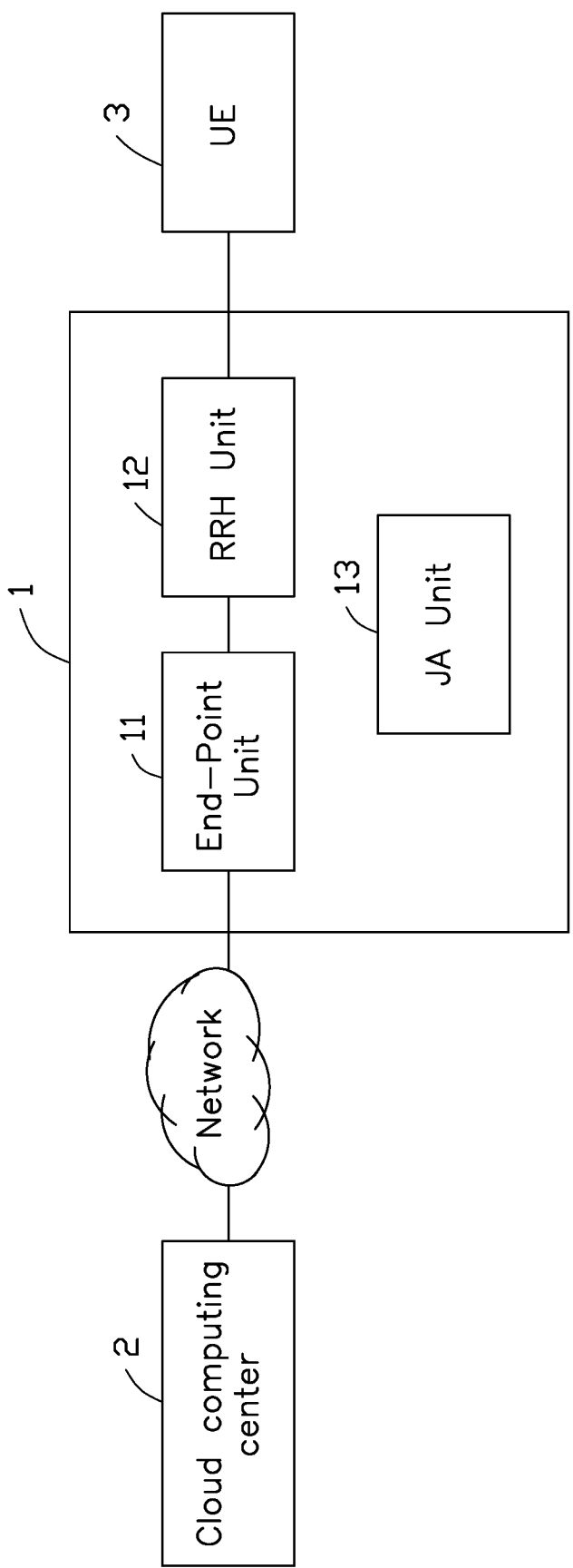
FIG. 1 illustrates a schematic diagram of an allocation system for wireless resource and computing resource, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the SGC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

FIG. 1 illustrates a schematic diagram having an allocation system 1 for wireless resource and computing resource, in accordance with an example implementation of the present disclosure.

As shown in FIG. 1, the allocation system 1 includes an end-point unit 11 and a Remote Radio Head (RRH) unit 12. The end-point unit 11 may be a base station or a Baseband Unit (BBU), which may be connected to a cloud computing center 2 through a network (e.g., the Internet). The RRH unit 12 is connected to the end-point unit 11, providing a wireless coverage area. The RRH unit 12 may be implemented using a radio transceiver, one or more antennas, and associated circuitry (e.g., RF circuitry, analog-to-digital/digital-to-analog converters, etc.). One or more User Equipments (UEs) 3 may access the network through the RRH unit 12.

It is noted that although FIG. 1 shows that an end-point unit 11 and an RRH unit 12 are included in the allocation system 1, the present disclosure is not limited thereto. In some implementations, the allocation system 1 may include several end-point units 11 and several RRH units 12. In some implementations, the allocation system 1 may not include RRH units 12, and the UE 3 may directly communicate with the end-point unit 11.

The allocation system 1 may further include a Joint Allocation (JA) unit 13, which may be included in the end-point unit 11 or located outside of the end-point unit 11 (e.g., located in a network node configured to manage one or more end-point units 11). The JA unit 13 may collect resource information from one or more entities (e.g., from at least one end-point unit 11 and/or at least one RRH unit 12) in the allocation system 1, and allocate available resources based on certain system utility requirement(s). In one implementation, the resource information may indicate the state or amount of the two types of available resources. For example, the resource information may not only indicate the state or amount of the available wireless resources in the system, but also the state or amount of available computing resources. The wireless resources may include carriers, resource blocks, the right to access the medium, etc. The computing resources may be presented by metric parameters such as processor loading, processor utilization, memory state, etc.

In one implementation, a wireless transmission between an RRH unit 12 and a UE 3 may be configured with a transmission mode (e.g., Geo-based service mode, device-to-device communication mode, gaming mode, localized service mode, Non-Orthogonal Multiple Access (NOMA) mode, etc.). Different transmission modes may correspond to different system performances (e.g., computing costs, data rates, and channel quality requirements, etc.), and need to consume different amounts of wireless resources and computing resources. The JA unit 13 may calculate (or obtain) the needed amount of wireless resources and computing resources corresponding to a transmission mode, and make resource allocation based on the calculated or obtained results. Because the JA unit 13 with the resource information is aware of the status and/or amount of both the wireless resources and computing resources available in the system, the JA unit 13 is able to schedule the allocation of these two types of resources jointly to meet one or more system utility requirements (e.g., resource utility maximization). The joint allocation of resources may be determined by, for example, user distribution and traffic patterns.

TABLE I below shows computing costs, data rates and channel quality requirements of different transmission modes. The JA unit may generate, record or maintain the relationship among the parameters in TABLE I, and implement certain joint allocation strategy.

It is noted that the numbers presented in TABLE I are for illustrative purposes only, not intended to limit the scope of the present disclosure in any way. Further, although five transmission modes #1 to #5 are included in TABLE I, the number of transmission modes in TABLE I can vary. In some implementations, more or less system performance factors may be considered. For example, the telecom charges for each transmission mode may be considered in TABLE I.

TABLE I

|  | Computing Cost | Data Rate | Channel Quality Requirement |
| --- | --- | --- | --- |
| Transmission Mode #1 | 1 | 2 | 3 |
| Transmission Mode #2 | 3 | 7 | 8 |
| Transmission Mode #3 | 5 | 14 | 14 |
| Transmission Mode #4 | 15 | 15 | 6 |
| Transmission Mode #5 | 18 | 20 | 9 |

In TABLE I, each number presented in the column, "Computing Cost," may refer to an amount of computing resources needed to be consumed when one unit of wireless resource (e.g., a certain amount of time-frequency resource block(s)) is allocated to the corresponding transmission mode. For example, if two units of wireless resources are allocated to transmission mode #2, then such allocation may need to consume 6 (=2*3) units of computing resources. On the other hand, each number presented in the column of "Data Rate" may refer to an amount of data throughput when one unit of wireless resource is allocated to the corresponding transmission mode. For example, if two units of wireless resources are allocated to transmission mode #2, then such allocation may produce 14 (=2*7) units of data throughputs. Further, each number presented in the column, "Channel Quality Requirement," may refer to a minimum channel quality requirement for a transmission mode. The JA unit 13 may choose a transmission mode for a UE according to TABLE I if the channel quality between the UE and an RRH unit is greater than (or equal to) the transmission mode's channel quality requirement. For example, if the channel quality between the UE 3 and the RRH unit 12 is equal to 7, transmission modes #1 or #6 can be chosen for the UE 3 by the JA unit 13, whereas transmission modes #2, #4 and #5 are inapplicable due to the UE's poor channel quality.

Figure 2:
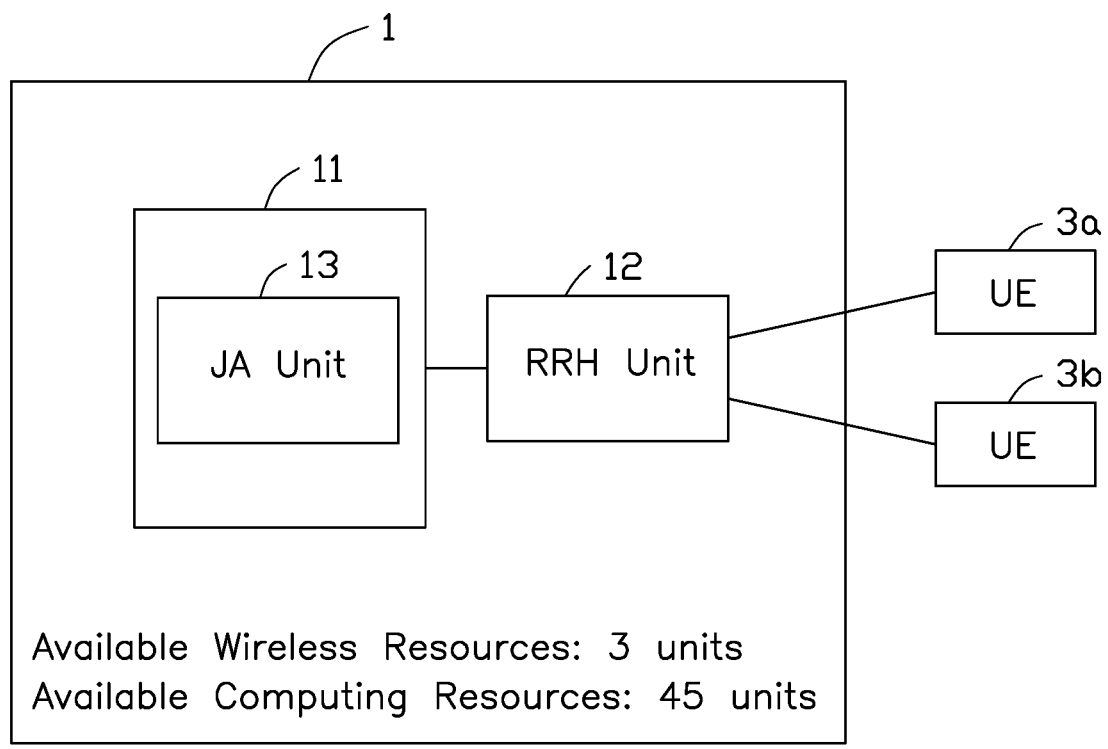
FIG. 2 illustrates a diagram of an example of joint resource allocation.

FIG. 2 illustrates an example joint resource allocation with reference to TABLE I. As shown in FIG. 2, the allocate system 1 has 3 units of available wireless resources and 45 units of available computing resources. A JA unit 13 in the allocation system 1 may acquire the resource information indicating the available wireless resources and the available computing resources from an end-point unit 11 and/or an RRH unit 12.

In the example of FIG. 2, UE 3a and UE 3b are connected with the RRH unit 12. The channel quality between the UE 3a and the RRH unit 12 is better than that between the UE 3b and the RRH unit 12. For example, the channel quality between the UE 3a and the RRH unit 12 is "15", whereas the channel quality between the UE 3b and the RRH unit 12 is "9". In such a case, based on TABLE I, transmission modes #1, #2, #3, #4 and #5 are applicable for the UE 3a, and transmission modes #1, #2, #4 and #5 are applicable for the UE 3b.

With resource information and TABLE I, the JA unit 13 is able to carry out various types of resource allocations using per-determined or pre-configured optimization algorithms/rules/processes. For example, the JA unit 13 may allocate 1 unit of wireless resource for the UE 3a with transmission mode #3 and 2 units of wireless resources for the UE 3b with transmission node #5, so as to maximize the overall data rate (e.g., 50 units of data throughputs).

In one implementation, the JA unit 13 may adjust its resource allocation setting(s) with the change of system conditions. For example, as the channel quality between the UE 3b and the RRH unit 12 gets worse (e.g., reduced from 9 to 6) and an amount of available computing resources is reduced to 25 units, the UE 3a and UE 3b may turn to employing transmission modes #3 and #4, respectively, and the JA unit 13 may allocate 2 units of wireless resources to the UE 3a with transmission mode #3 and 1 unit of wireless resource to the UE 3b with transmission mode #4, so as to maximize the data rate under the deteriorated system condition.

It is noted that the examples given above are not intended to constrain the scope of the present disclosure. In some implementations, information items presented in TABLE I can be organized as other types of data structure, and provided to the JA unit 13 for resource allocation.

In some implementations, the allocation system 1 may further include a gateway (GW) unit. The JA unit 13 may be included in at least one of an end-point unit, a GW unit, and an RRH unit. Further, an RRH unit (e.g., an RRH unit 12) in the allocation system 1 may be implemented as having or having no computing function. Therefore, the way the JA unit 13 acquires the resource information through may be various, as shown in FIGS. 3A, 3B, 4A, 4B and 5.

Figure 3A:
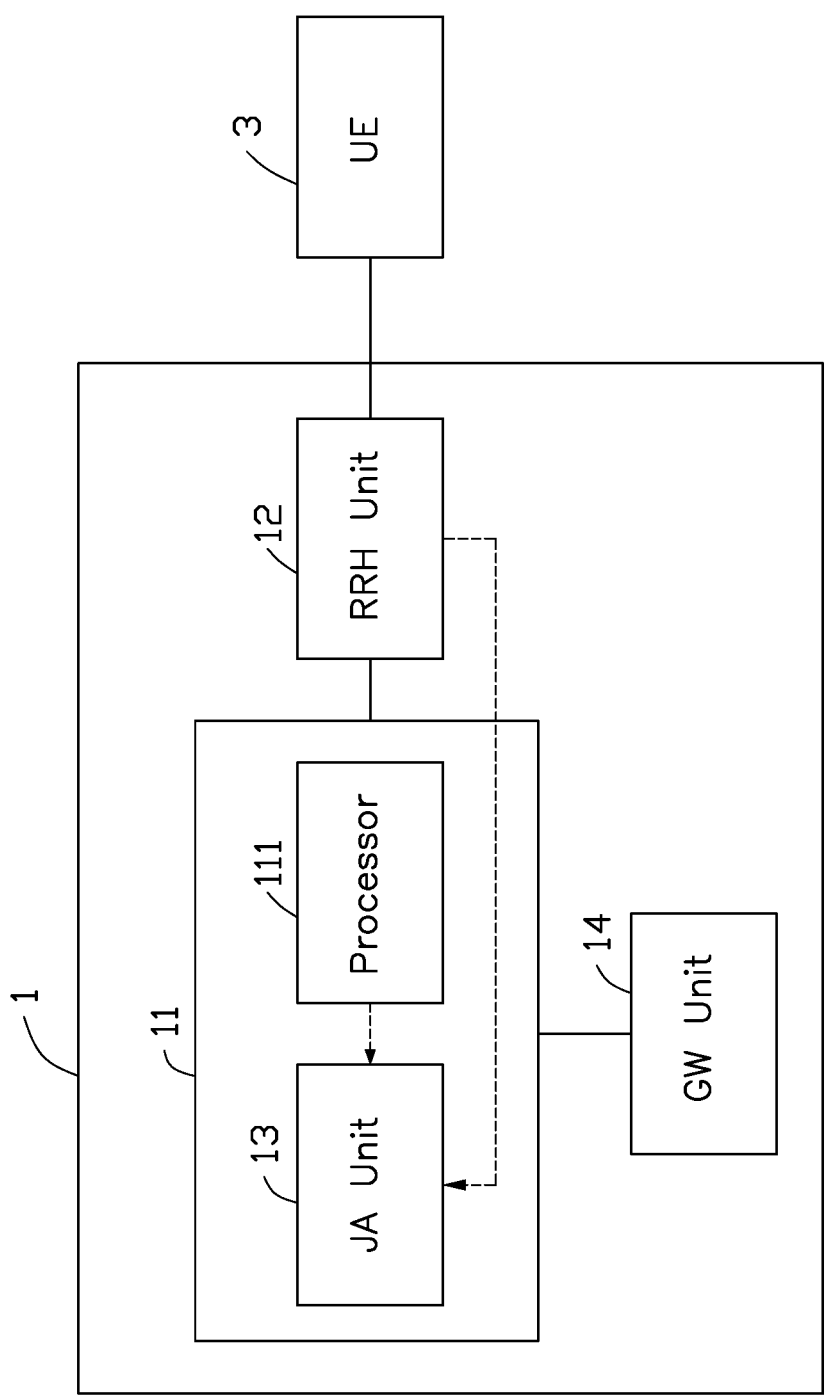
FIG. 3A illustrates a schematic diagram of an allocation system for wireless resource and computing resource, in accordance with an example implementation of the present disclosure.

Referring to FIG. 3A, an allocation system 1 further includes a GW unit 14. The GW unit 14 is connected to an end-point unit 11 including a JA unit 13. In the example of FIG. 3A, an RRH unit 12 (or Front-End) has a Radio Frequency (RF) function for transmitting, receiving, and/or amplifying signals, but does not have a computing function for data processing. For example, the RRH unit 12 may be implemented by a processor-less hardware structure including, for example, a radio transceiver, one or more antennas, and associated circuitry. The end-point unit 11 may include at least one processor 111, which provides the computing function. In such a case, the end-point unit 11 has the capability of processing/computing data.

As shown in FIG. 3A, the JA unit 13 may acquire resource information from the end-point unit 11 and the RRH unit 12. The resource information may include two parts: first information and second information. The first information may be used to indicate the available wireless resource(s), and the second information may be used to indicate the available computing resource(s). For example, in FIG. 2, the first information and the second information indicate that there are 3 units of wireless resources and 45 units of computing resources can be used, respectively, in the system.

In the example of FIG. 3A, because the RRH unit 12 may not have computing function, the JA unit 13 may acquire the second information merely from the end-point unit 11 (e.g., from the processor 111 of the end-point unit 11). On the other hand, because both the end-point unit 11 and the RRH unit 12 possess the wireless resources, the JA unit 13 may acquire the first information from the end-point unit 11 and the RRH units 12.

With the first and second information, the JA unit 13 may know how many wireless resources and computing resources in the system can be used in the resource allocation, thereby performing an optimized resource allocation to meet certain system utility requirement(s).

Figure 3B:
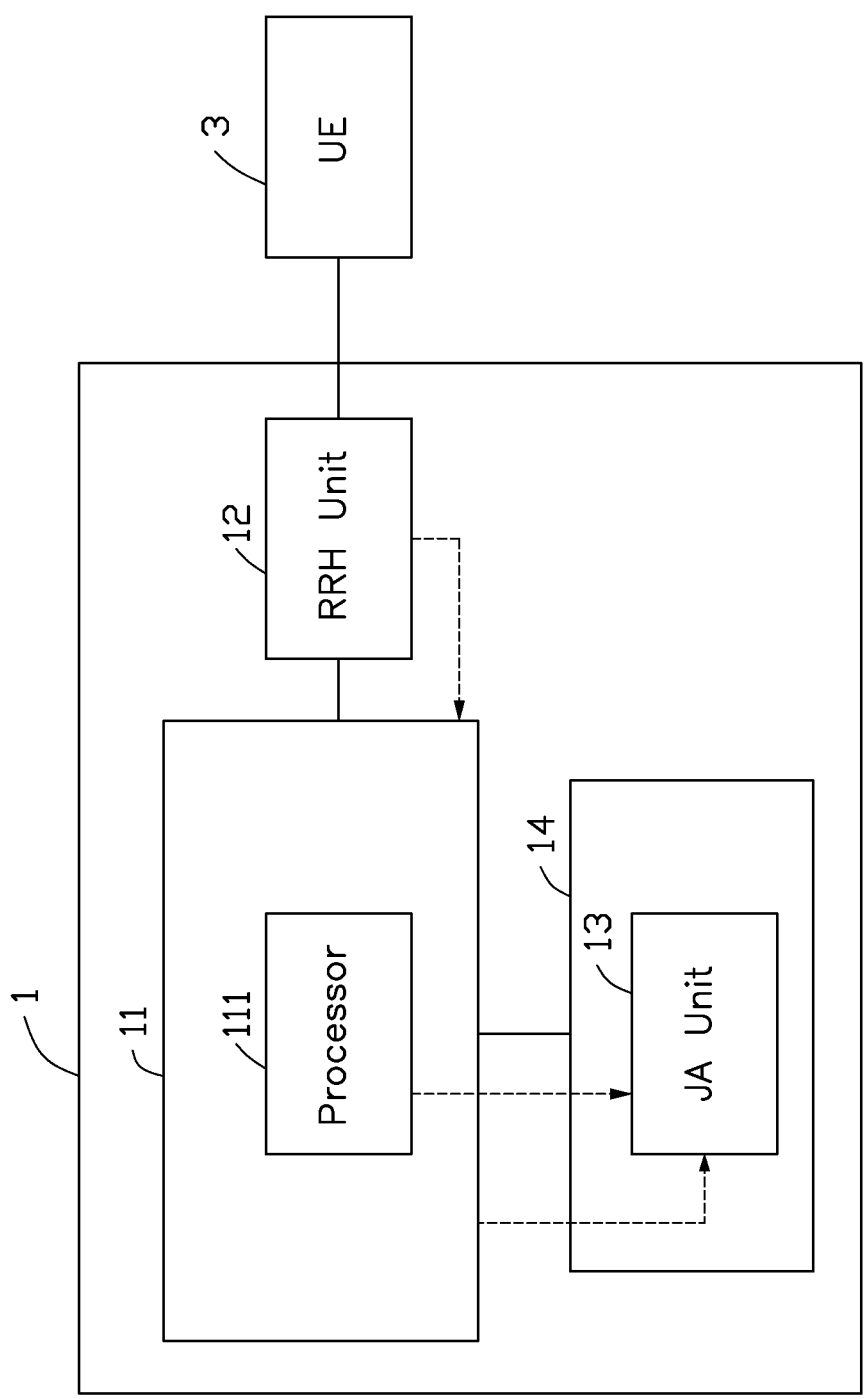
FIG. 3B illustrates a schematic diagram of an allocation system for wireless resource and computing resource, in accordance with an example implementation of the present disclosure.

In one implementation, as shown in FIG. 3B, the JA unit 13 is included in the GW unit 14, and acquires both the first information and the second information from the end-point unit 11.

In the example of FIG. 3B, because both the end-point unit 11 and the RRH unit 12 have their own wireless resources, the first information may not only indicate an amount of available wireless resources in the end-point unit 11, but also an amount of available wireless resources in the RRH unit 12. Thus, a part of the first information may be provided by the end-point unit 11, and another part of the first information may be provided by the RRH unit 12 and forwarded by the end-point unit 11.

Figure 4A:
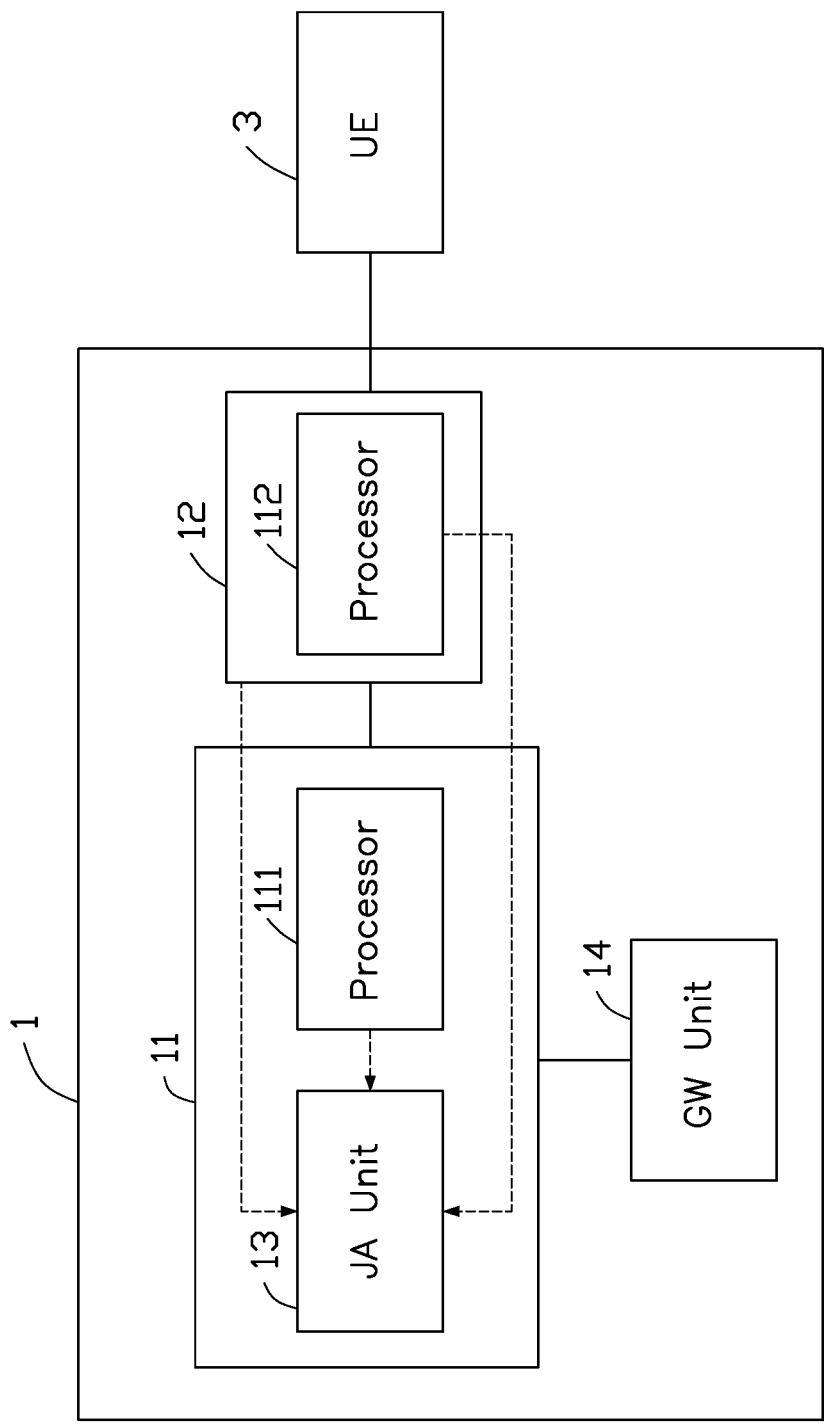
FIG. 4A illustrates a schematic diagram of an allocation system for wireless resource and computing resource, in accordance with an example implementation of the present disclosure.
Figure 4B:
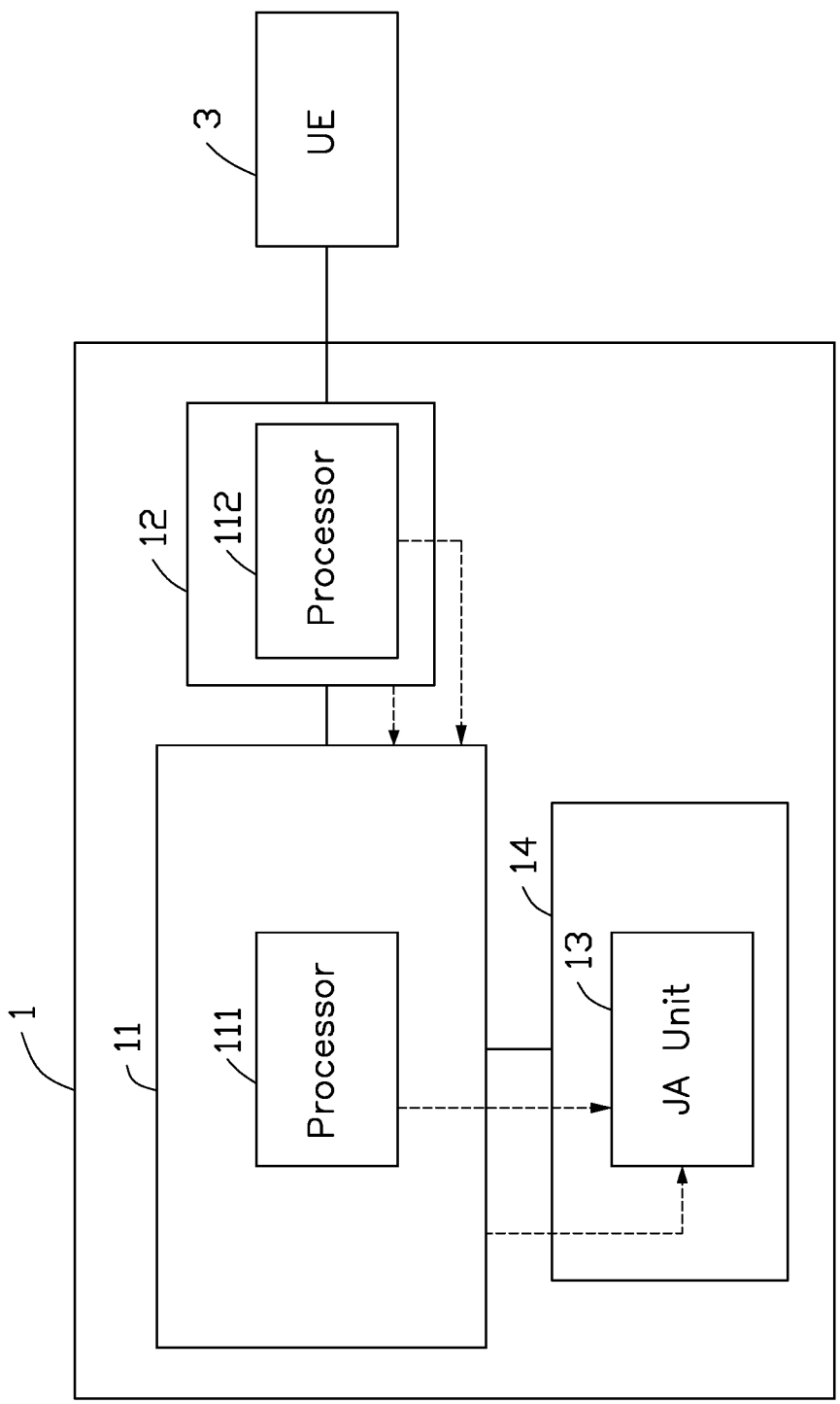
FIG. 4B illustrates a schematic diagram of an allocation system for wireless resource and computing resource, in accordance with an example implementation of the present disclosure.

In some implementations, an RRH unit (e.g., an RRH unit 12) may also have a computing function. As shown in FIGS. 4A and 4B, the RRH unit 12 may include at least one processor 112.

Referring FIG. 4A, an allocations system 1 includes an end-point unit 11, an RRH unit 12 and a GW unit 14. The RRH unit 12 may communicate with a UE 3. A JA unit 13 is included in the end-point unit 11 and may acquire resource information from the end-point unit 11 and the RRH unit 12. The end-point unit 11 may further include a processor 111, which provides a computing function and has certain amounts of computing resources. The resource information may include first information indicating an amount of available wireless resource and second information indicating an amount of available computing resource. Regarding to the first information, the JA unit 13 may collect the resource information from both the end-point unit 11 and the RRH unit 12. Regarding the second information, because both the end-point unit 11 and the RRH unit 12 may have their own computing resources, the second information may not only indicate an amount of available computing resources in the processor 111 of the end-point unit 11, but also an amount of available computing resources in the processor 112 of RRH unit 12. Thus, the JA unit 13 may acquire the second information from both the end-point unit 11 and the RRH unit 12.

Referring FIG. 4B, an allocations system 1 includes an end-point unit 11 including a processor 111, an RRH unit 12 including a processor 112 and a GW unit 14. The RRH unit 12 may communicate with a UE 3. A JA unit 13 is included in the GW unit 14, and may acquire the first information and the second information from the end-point unit 11. Because in FIG. 4B the RRH unit 12 may have its own wireless resources and computing resources, a part of the second information indicating the computing resource state of the RRH unit 12 may be provided by the RRH unit 12 and forwarded to the JA unit 13 by the end-point unit 11.

Figure 5:
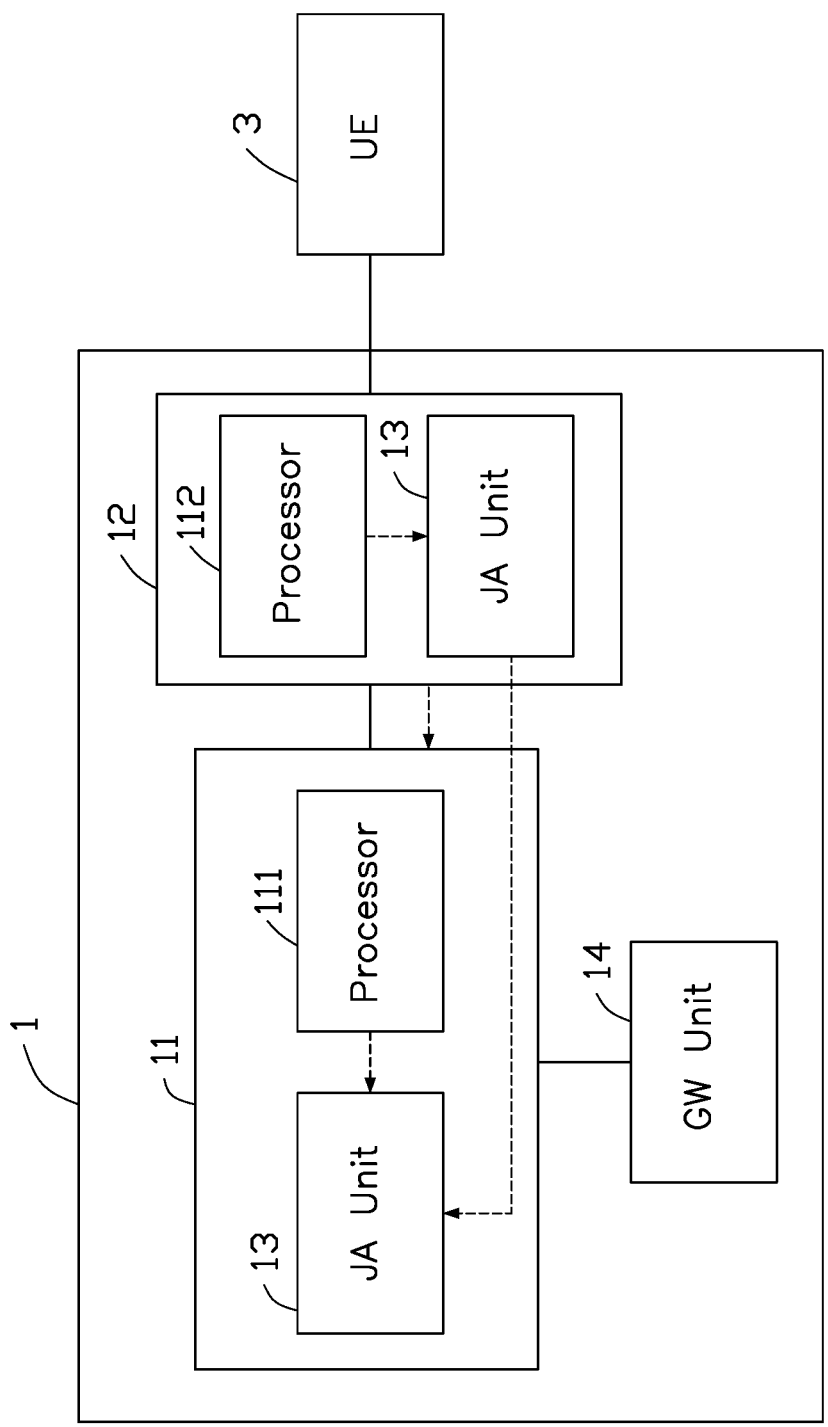
FIG. 5 illustrates a schematic diagram of an allocation system for wireless resource and computing resource, in accordance with an example implementation of the present disclosure.

In one implementation, a JA unit may be distributed in multiple entities of an allocation system. As shown in FIG. 5, an allocations system 1 includes an end-point unit 11 including a processor 111, an RRH unit 12 including a processor 112, and a GW unit 14. The RRH unit 12 may communicate with a UE 3. A JA unit 13 is included in each of the end-point unit 11 and the RRH unit 12. In such a case, downlink signals transmitted from the RRH unit 12 to a UE (e.g., a UE 3) may be encoded and processed at the end-point unit 11 (or the RRH unit 12). For example, the end-point unit 11 (or the RRH unit 12) may apply a Successive Interference Cancellation (SIC) encoding procedure to the signals to be transmitted to a target UE. If the computing resource available in resource allocation is insufficient, the end-point unit 11 (or the RRH unit 12) may give priority to encoding signals necessary to be transmitted. For signal reception, the UE 3 may apply a SIC decoding procedure to signals received from the RRH unit 12.

Figure 6:
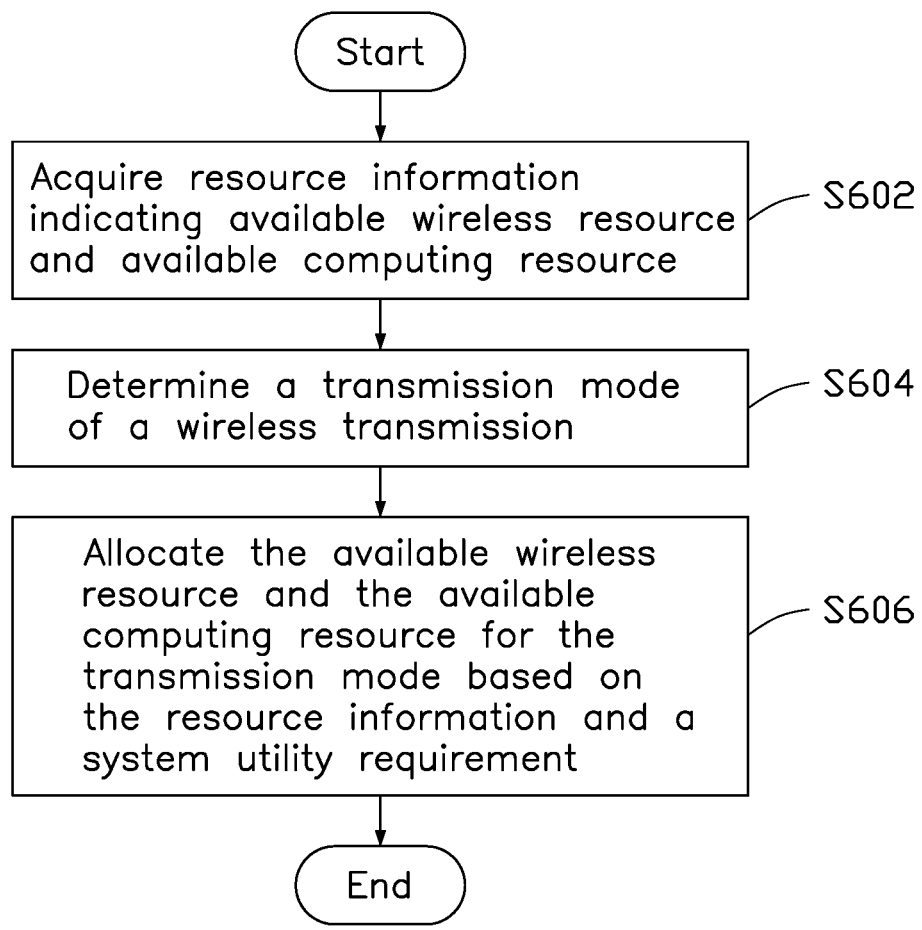
FIG. 6 illustrates a flowchart of a method for resource allocation, in accordance with an example implementation of the present disclosure.

FIG. 6 illustrates a flowchart of a method 600 for resource allocation, in accordance with an example implementation of the present disclosure.

The method 600 is provided by way of example, as there are a variety of ways to carry out the method. The method 600 described below can be carried out using the configurations illustrated in FIGS. 1, 2, 3A, 3B, 4A, 4B and 5, for example, and various elements of these figures are referenced in elaborating the exemplary method 600. Each block shown in FIG. 6 may represent one or more processes, actions or subroutines, carried out in the exemplary method 600. Furthermore, the illustrated order of blocks is illustrative only and the order of the blocks can change in response to the present disclosure. Additional block(s) can be added or fewer block(s) may be utilized, without departing from the scope of the present disclosure.

As shown in FIG. 6, in block S602, a JA unit (e.g., the JA unit 13 in FIG. 1, 2, 3A, 3B, 4A, 4B or 5) may acquire resource information indicating an available wireless resource and an available computing resource. The wireless resource may include carriers, resource blocks, the right to access the medium, etc. The computing resource may correspond to, for example, the load or utilization of at least one processor/processing circuitry.

In block S604, the JA unit may determine a transmission mode of a wireless transmission. The wireless transmission may be, for example, a transmission between a UE (e.g., the UE 3 in FIG. 1, 2, 3A, 3B, 4A, 4B or 5) and an RRH unit (e.g., the RRH unit 12 in FIG. 1, 2, 3A, 3B, 4A, 4B or 5). The transmission mode may be a Geo-based service mode, a device-to-device communication mode, a gaming mode, a localized service mode, a NOMA mode, etc. In some implementations, the JA unit may determine the transmission mode based on certain resource conditions (e.g., the amount of available resources or resource utilization limitations) and/or system performance conditions (e.g., QoS of user, system utility, transmission rate or other metrics for traffic/user prioritization). Because different transmission modes may employ different modulation and coding schemes, they may consume different amounts of computing resources. For example, when the wireless transmission adopts the NOMA mode, the JA unit may determine that spending more computing resources to ensure the data throughput under a poor signal quality environment.

In block S606, the JA unit may allocate the available wireless resource and the available computing resource for the transmission mode based on the resource information and a system utility requirement. The system utility requirement may be a requirement of achieving maximum data throughputs, maximum utility of available wireless resources, maximum utility of available computing resources, or any other pre-configured system utility policy/rule (e.g., complexity of the transmission mode, user/traffic weighting, or the corresponding signaling feedback design for the resource configuration). The joint allocation of the computing resources and the wireless resources performed by the JA unit may be prioritized by the system utility requirement(s).

Figure 7:
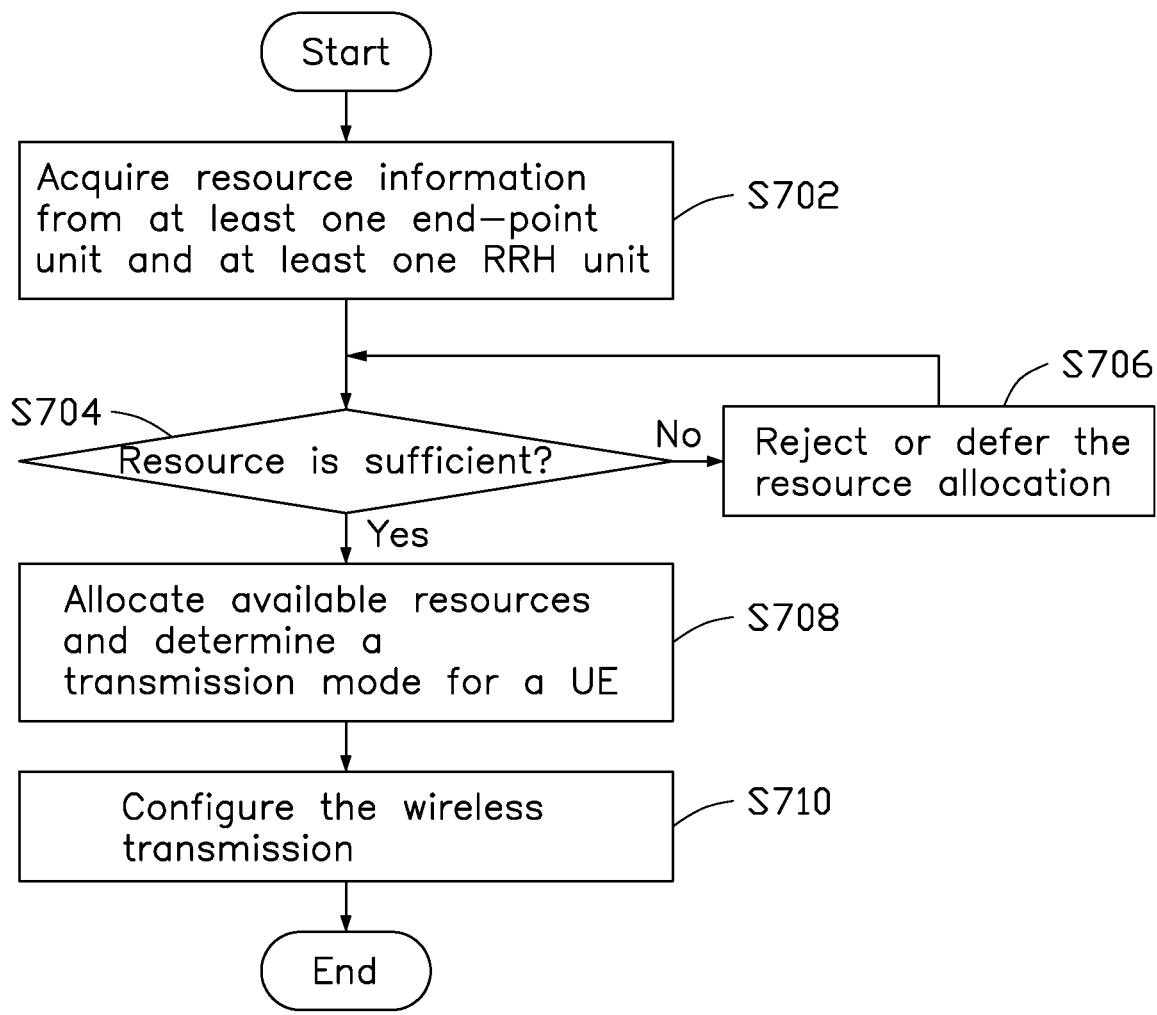
FIG. 7 illustrates a flowchart of a method for resource allocation, in accordance with an example implementation of the present disclosure.

FIG. 7 illustrates a flowchart of a method 700 for resource allocation, in accordance with an example implementation of the present disclosure.

In block S702, a JA unit (e.g., the JA unit 13 in FIG. 1, 2, 3A, 3B, 4A, 4B or 5) may acquire resource information from at least one end-point unit (e.g., the end-point unit 11 in FIG. 1, 2, 3A, 3B, 4A, 4B or 5) and at least one RRH unit (e.g., the RRH unit 12 in FIG. 1, 2, 3A, 3B, 4A, 4B or 5). The resource information may be used to indicate how many wireless resources and computing resources are available in resource allocation of a wireless transmission.

In block S704, the JA unit may determine whether the amount of the available wireless resources and the available computing resources is sufficient to meet the requirement of performing a wireless transmission.

If the outcome of the determination of block S704 is No, then the method 700 continues to block S706. In block S706, the JA unit may reject or defer the resource allocation. Then, the method 700 may go back to block S704, in which the JA unit may keep checking whether the available resources are sufficient to support the wireless transmission or not.

If the outcome of the determination of block S704 is Yes, then the method 700 continues to block S708. In block S708, the JA unit may allocate the available wireless resources and the available computing resources based on certain system utility requirement(s), and determine a transmission mode for a UE (e.g., the UE 3 in FIG. 1, 2, 3A, 3B, 4A, 4B or 5).

In one implementation, the JA unit may further check the number of UEs communicated with an RRH unit by the NOMA mode.

In block S710, the JA unit may configure the wireless transmission according to the transmission mode and the allocated wireless resources and computing resources.

Figure 8:
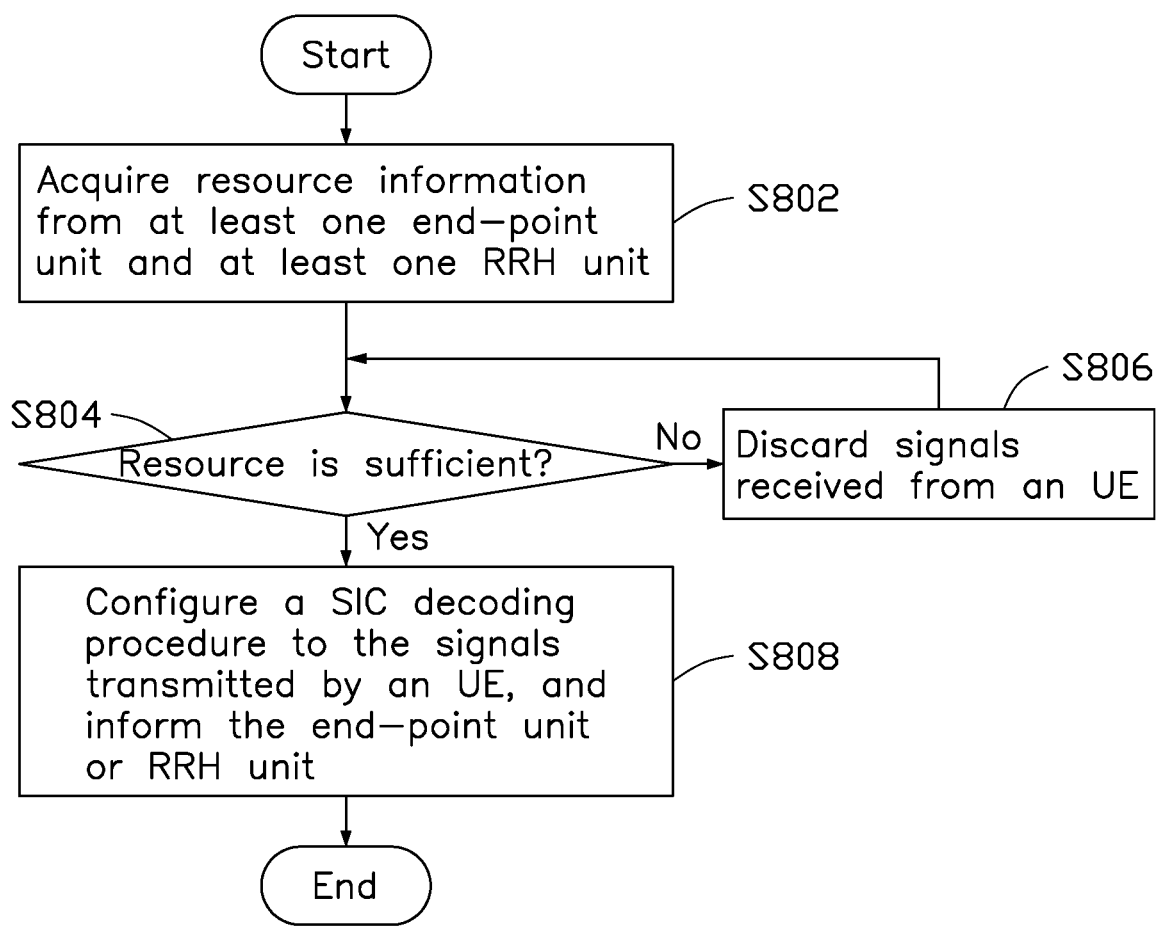
FIG. 8 illustrates a flowchart of a method for resource allocation, in accordance with an example implementation of the present disclosure.

FIG. 8 illustrates a flowchart of a method 800 for resource allocation, in accordance with an example implementation of the present disclosure.

In block S802, a JA unit (e.g., the JA unit 13 in FIG. 1, 2, 3A, 3B, 4A, 4B or 5) may acquire resource information from at least one end-point unit (e.g., the end-point unit 11 in FIG. 1, 2, 3A, 3B, 4A, 4B or 5) and at least one RRH unit (e.g., the RRH unit 12 in FIG. 1, 2, 3A, 3B, 4A, 4B or 5). The resource information may be used to indicate how many wireless resources and computing resources are available in resource allocation of a wireless transmission.

In block S804, the JA unit may determine whether the amount of the available wireless resources and the available computing resources is sufficient to meet the requirement of performing a wireless transmission.

If the outcome of the determination of block S804 is No, then the method 800 continues to block S806. In block S806, the JA unit may discard signals received from a UE. Then, the method 800 may go back to block S804, in which the JA unit may keep checking whether the available resources are sufficient to support the wireless transmission or not.

If the outcome of the determination of block S804 is Yes, then the method 800 continues to block S808. In block S808, the JA unit may perform a SIC decoding procedure on the signals transmitted by the UE, and inform the end-point unit or RRH unit.

Figure 9:
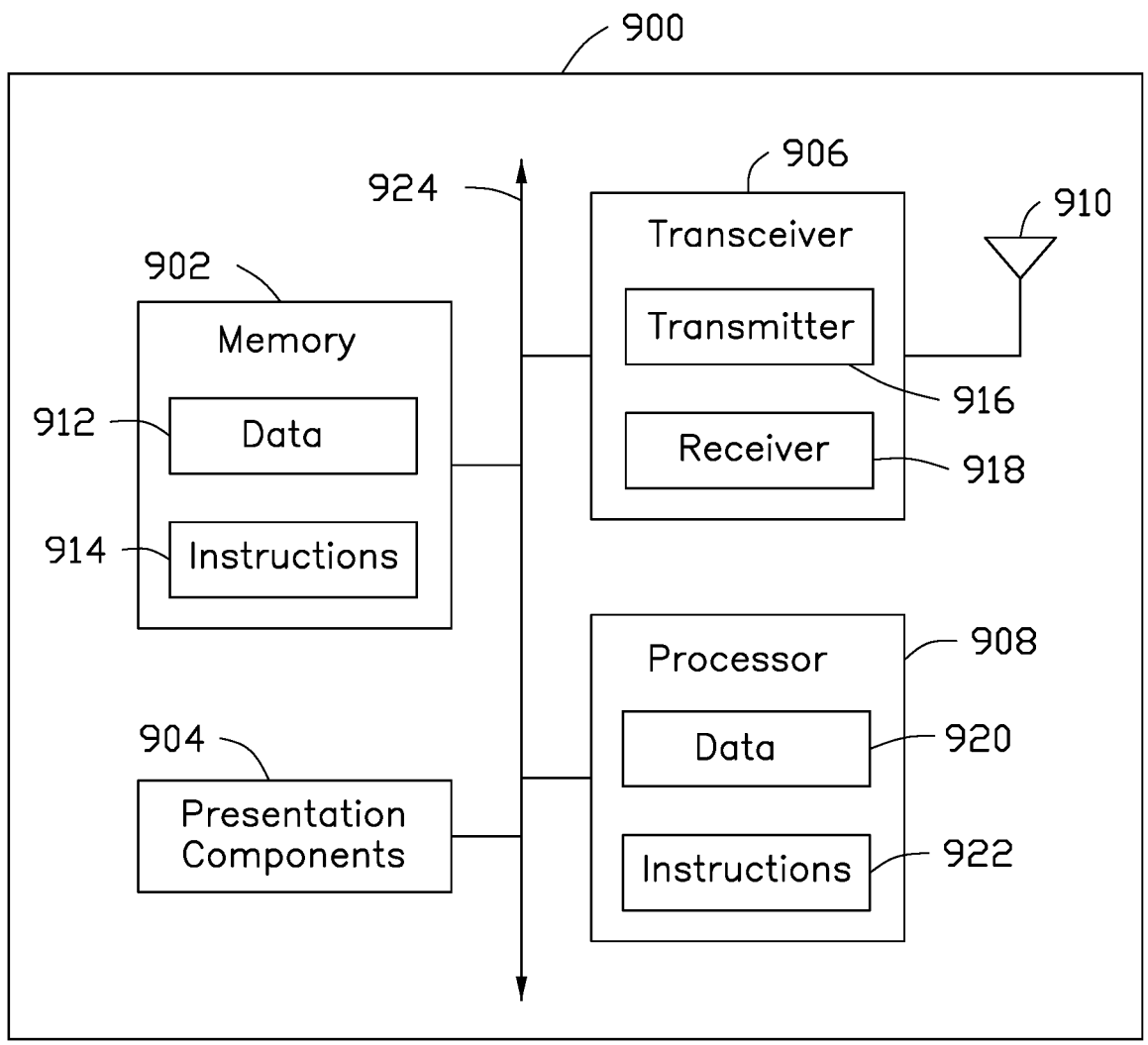
FIG. 9 shows a block diagram of wireless communication device, in accordance with various aspects of the present application.

FIG. 9 shows a block diagram of wireless communication device, in accordance with various aspects of the present application. The wireless communication device may be realized as a JA unit as described herein.

As shown in FIG. 9, the wireless communication device 900 may include a transceiver 906, a processor 908, a memory 902, one or more presentation components 904, and at least one antenna 910. The wireless communication device 900 may also include an RF spectrum band module, a base station communications module, a network communications module, and a system communications management module, input/output (I/O) ports, I/O components, and power supply (not explicitly shown in FIG. 9). Each of these components may be in communication with each other, directly or indirectly, over one or more buses 924.

The transceiver 906 having a transmitter 916 (e.g., having transmitting/transmission circuitry) and a receiver 918 (e.g., having receiving/reception circuitry) may be configured to transmit and/or receive time and/or frequency resource partitioning information. In some implementations, the transceiver 906 may be configured to transmit in different types of subframes and slots including, but not limited to, usable, non-usable and flexibly usable subframes and slot formats. The transceiver 906 may be configured to receive data and control channels.

The wireless communication device 900 may include a variety of computer-readable media. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media.

The memory 902 may include computer-storage media in the form of volatile and/or non-volatile memory. The memory 902 may be removable, non-removable, or a combination thereof. Example memory includes solid-state memory, hard drives, optical-disc drives, and etc. As illustrated in FIG. 9, the memory 902 may store data 912 and computer-readable, computer-executable instructions 914 (e.g., software codes) that are configured to, when executed, cause the processor 908 to perform various functions described herein, for example, with reference to FIGS. 1 through 8. Alternatively, the instructions 914 may not be directly executable by the processor 908 but be configured to cause the wireless communication device 900 (e.g., when compiled and executed) to perform various functions described herein.

The processor 908 may include an intelligent hardware device, e.g., a central processing unit (CPU), a microcontroller, an ASIC, etc. The processor 908 may include memory. The processor 908 may process data 920 and instructions 922 received from the memory 902, and information through the transceiver 906, the base band communications module, and/or the network communications module. The processor 908 may also process information to be sent to the transceiver 906 for transmission through the antenna 910.

One or more presentation components 904 presents data indications to a person or other device. Example one or more presentation components 904 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A wireless communication device applicable in a base station, the wireless communication device comprising:
one or more non-transitory computer-readable media having computer-executable instructions embodied thereon; and
at least one processor coupled to the one or more non-transitory computer-readable media, and configured to execute the computer-executable instructions to:
acquire first information from the base station and a Remote Radio Head (RRH) unit connected to the base station, wherein the first information indicating an amount of available wireless resource, wherein the wireless resource comprises carriers, resource blocks, and a right to access a medium;
acquire second information from the base station, wherein the second information indicating an amount of available computing resource, wherein the computing resource is presented by metric parameters comprise processor loading, processor utilization and memory state; and
determine whether the amount of available wireless resource and the amount of available computing resource is sufficient to meet a requirement of performing a wireless transmission according to the first information and the second information; and
allocate the amount of available wireless resource and the amount of available computing resource for a transmission mode of a wireless transmission based on the first and the second information when the amount of available wireless resource and the amount of available computing resource is sufficient to meet the requirement of performing the wireless transmission.

2. The wireless communication device of claim 1, wherein the transmission mode is a Geo-based service mode, a device-to-device communication mode, a gaming mode, a localized service mode, or a NOMA mode.

3. The wireless communication device of claim 1, wherein the system utility requirement is a requirement of achieving maximum data throughputs, maximum utility of available wireless resources, maximum utility of available computing resources, or pre-configured system utility policy.

4. A method for resource allocation performed by a wireless communication device, the method comprising:
acquiring first information from a base station and a Remote Radio Head (RRH) unit connected to the base station, wherein the first information indicating an amount of available wireless resource, wherein the wireless resource comprises carriers, resource blocks, and a right to access a medium;
acquiring second information from the base station, wherein the second information indicating an amount of available computing resource, wherein the computing resource is presented by metric parameters comprise processor loading, processor utilization and memory state; and
determining whether the amount of available wireless resource and the amount of available computing resource is sufficient to meet a requirement of performing a wireless transmission according to the first information and the second information; and
allocating the amount of available wireless resource and the amount of available computing resource for a transmission mode of a wireless transmission based on the first and second information when the amount of available wireless resource and the amount of available computing resource is sufficient to meet the requirement of performing the wireless transmission.

5. The method of claim 4, wherein the transmission mode is a Geo-based service mode, a device-to-device communication mode, a gaming mode, a localized service mode, or a NOMA mode.

6. The method of claim 4, wherein the system utility requirement is a requirement of achieving maximum data throughputs, maximum utility of available wireless resources, maximum utility of available computing resources, or pre-configured system utility policy.

* * * * *